W. HOOPER,

Assignor, by mesne assignments, to E. C. and H. M. BENEDICT, and G. CONKLING, trustees for the UNION ORE CONCENTRATOR COMPANY.

JIG FOR SEPARATING ORES.

No. 9,894. Reissued Oct. 18, 1881.

WITNESSES:

Wm. C. Tibby Jr.

W. F. Hapgood.

INVENTOR:

William Hooper

BY Gifford & Gifford

ATTORNEYS.

N. PETERS, Photo-Lithographer, Washington, D. C.

UNITED STATES PATENT OFFICE.

WILLIAM HOOPER, OF TICONDEROGA, N. Y., ASSIGNOR, BY MESNE ASSIGNMENTS, TO ELIAS C. BENEDICT, HENRY M. BENEDICT, AND GURDON CONKLING, TRUSTEES FOR THE UNION ORE CONCENTRATOR COMPANY.

JIG FOR SEPARATING ORES.

SPECIFICATION forming part of Reissued Letters Patent No. 9,894, dated October 18, 1881.

Original No. 184,870, dated November 28, 1876. Application for reissue filed March 7, 1881.

*To all whom it may concern :*

Be it known that I, WILLIAM HOOPER, of Ticonderoga, in the county of Essex and State of New York, have invented a new and useful Improvement in Jigs for Separating Ore and other Materials, which improvement is fully set forth in the following specification, reference being had to the accompanying drawings, in which—

Figure 1:
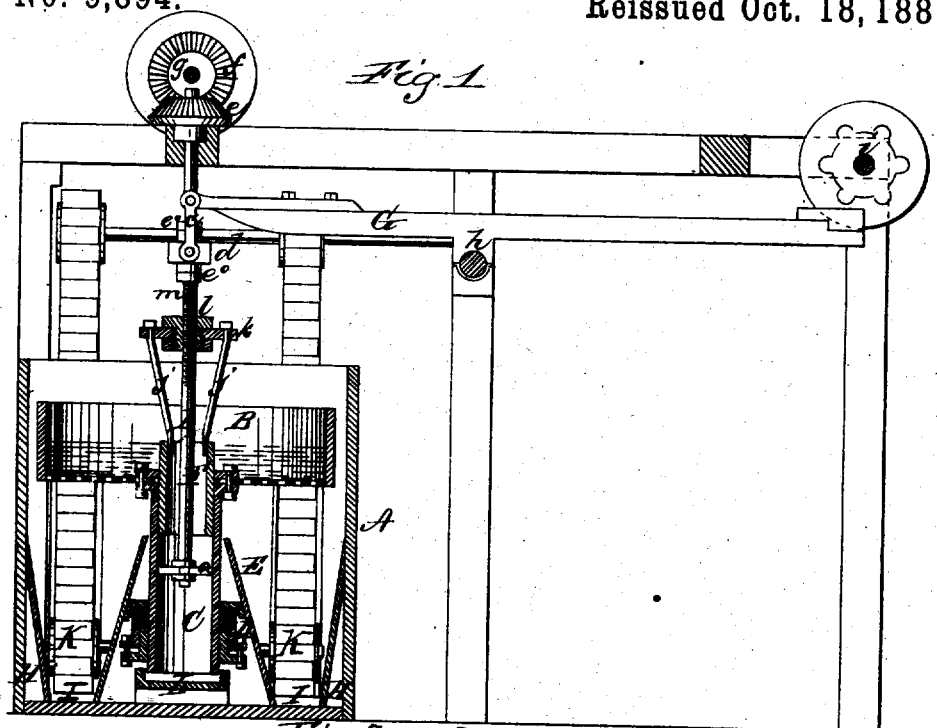
Figure 3:
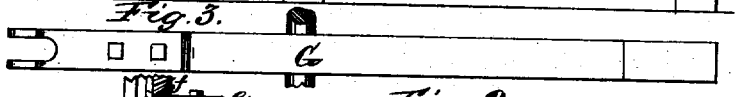
Figure 2:
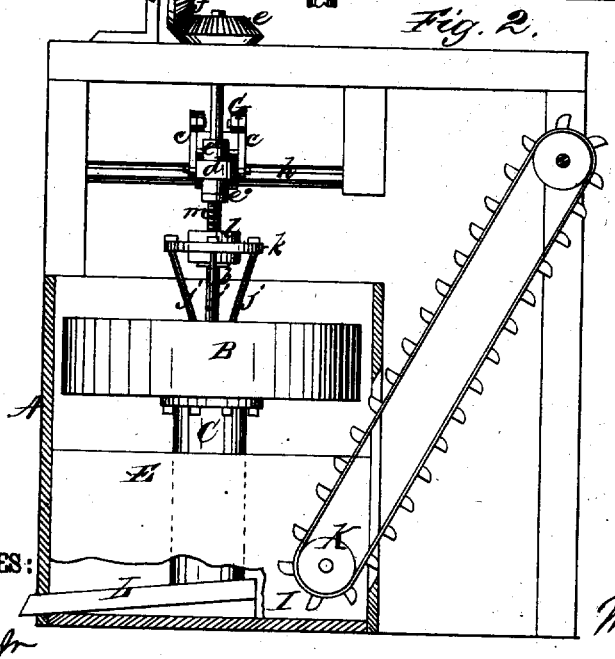

Figure 1 represents a vertical central section. Fig. 2 is a sectional front view. Fig. 3 is a plan of the working-lever, detached.

Similar letters indicate corresponding parts.

Heretofore jigs for separating ore have been used in tubs or vessels containing water, the water being supplied to the tub or vessel by a suitable pipe or trough and passing out of the tub or vessel through the jig, so as to carry the waste matter with it to a certain extent. It is also well known that elevators have been applied to the tubs or vessels for elevating the ore in various ways—for instance, the elevator passing through a hole in the side of the tub or vessel and through a spout connected with said hole or out of the top of the tub or vessel on one side of the jig.

My invention consists in combining with a jig mechanism for imparting to the jig a combined revolving and jumping motion.

It also consists in a new construction and arrangement of a jig and other improvements, which will be described.

In the drawings, the letter A designates a tub, of wood or any other suitable material, in which is situated the jig B. From the bottom of this jig, at its center, extends a tube, C, which is open above and below, and which passes through a stuffing-box, D, secured beneath a roof-shaped partition, E, which is fastened on the bottom of the tub A.

In the tube C is firmly secured a cross, *a*, in which is fastened a shaft, *b*, that extends up through the jig B, and is suspended by means of straps *c* from a lever, G. The straps *c* are attached to a ring, *d*, which is confined on the shaft by collars $e^0$, and in which said shaft can revolve freely. The upper end of the shaft *b* extends through a bevel-wheel, *e*, to which it is connected by a feather-key, and which receives a revolving motion by a bevel-wheel, *f*, mounted on the driving-shaft *g*. The lever G has its fulcrum on a rock-shaft, *h*, and its rear end is exposed to the action of the tappet-wheel *i*, whereby a rising-and-falling or jumping motion is imparted to the shaft *b* and the jig B, while at the same time said shaft, together with the jig, receives a revolving motion by means of the bevel-gear, as above stated.

In the tube C, which extends from the bottom of the jig, a sleeve or spout, F, is fitted, which connects by rods *j* with a ring, *k*, supported by a nut, *l*, that fits a screw-thread, *m*, cut on the shaft *b*. By turning this nut the spout F is raised or lowered. On the inner sides of the tub A are secured inclined partitions H, which, together with the sides of the roof-shaped partitions E, form wells I, in which work the elevators K. The bottom of the jig is made in the form of a sieve, the openings or meshes of which may be of any suitable size, according to the nature of the material to be separated.

The lever G, which serves to produce the jumping motion of the jig, may be so arranged that it can be readily disengaged from the shaft *b*, or that it can be thrown out of gear with its tappet-wheel *i*, in which case a simple revolving or reciprocating revolving motion is imparted to the jig.

The material to be separated is introduced into the jig B, either by means of a shovel, or it may be fed therein through a hopper, or by any other suitable means, and as the jig receives motion the heavy particles settle down and escape through the meshes of the jig, while the light particles accumulate above and are discharged. The escape of the heavy particles through the meshes of the jig is facilitated by imparting to the jig a jumping motion, and by combining the revolving or reciprocating revolving motion and the jumping motion the separation of the heavy from the lighter particles can be effected rapidly. By the motion a level bed of the material to be separated is formed on the bottom of the jig, said bed being composed of particles of a certain specific gravity, which gradually escape through the meshes of the jig and accumulate in the elevator-wells I. The discharge of the light material which accumulates on top of said bed is greatly facilitated by having the discharge take place from the middle of the jig through a pipe, preferably consisting of the spout F and tube C, as shown in the drawings, as by having the discharge-opening at the middle it is as near as possible equally distant from all parts of the jig. This object is further accomplished by having the jig round. By raising the spout the depth of the bed in the jig is increased, and the percentage of the material discharged through said spout is reduced, and vice versa. The light material which discharges through the spout drops into a trough, L, which extends out through the side of the tub A, and it may either be subjected to a further separation or thrown away as waste. The heavy material which drops through the meshes or openings in the bottom of the sieve is carried up by the elevators K, which are arranged in connection with the tub or vessel in the manner in which elevators have commonly been arranged in connection with tubs or vessels for a like purpose, so as to elevate the ore from the bottom of the tub or vessel to any desired position.

What I claim as new, and desire to secure by Letters Patent, is—

1. A jig for separating ore or other material having an opening in its bottom, in combination with an adjustable tube, constructed and arranged to rise and fall with the jig, and leading through said opening for regulating the discharge of the water and waste material, and mechanism for giving the jig a jumping motion, substantially as set forth.

2. The combination of the jig B, mechanism for giving it a jumping motion, the tube C, and spout F, the spout F being adjustably connected with the tube C to move vertically therewith, substantially as and for the purpose specified.

3. The combination, with a jig, of mechanism for imparting to the same a combined revolving and jumping motion, substantially as described.

4. The combination, with a jig provided with mechanism for imparting a revolving motion, of the central spout, C, the movable tube F, the arms *j*, connected thereto, the ring *k*, nut *l*, and screw-rod *b*, substantially as described.

5. A jig provided with a bottom perforated with openings adapted to freely discharge the heavier material through said openings, in combination with a pipe leading through the bottom and constructed to move vertically with said jig for the discharge of the waste matter, substantially as described.

6. A jig provided with a bottom perforated to freely discharge the heavy material through said bottom, and an opening above the bottom connected with a tube to carry the waste material, in combination with a stationary receiver for the heavy material, substantially as described.

7. A jig for separating ore or other material, having an opening through its bottom, in combination with mechanism for giving it a jumping motion, and a pipe leading through said opening for the discharge of the waste matter, said pipe being so arranged as to move vertically with said jig, substantially as described.

In testimony that I claim the foregoing I have hereunto set my hand this 2d day of November, 1880.

WILLIAM HOOPER.

Witnesses:
G. CONKLING,
JOHN C. FENTON.